United States Patent
Cheben et al.

(10) Patent No.: US 8,503,839 B2
(45) Date of Patent: Aug. 6, 2013

(54) COMPOSITE SUBWAVELENGTH-STRUCTURED WAVEGUIDE IN OPTICAL SYSTEMS

(75) Inventors: Pavel Cheben, Ottawa (CA); Przemek J. Bock, Gloucester (CA); Jens H. Schmid, Ottawa (CA); Dan-Xia Xu, Gloucester (CA); Adam Densmore, Victoria (CA); Siegfried Janz, Ottawa (CA)

(73) Assignee: National Research Council of Canada, Ottawa, Ontario (CA)

(*) Notice: Subject to any disclaimer, the term of this patent is extended or adjusted under 35 U.S.C. 154(b) by 23 days.

(21) Appl. No.: 13/349,957

(22) Filed: Jan. 13, 2012

(65) Prior Publication Data

US 2012/0183250 A1 Jul. 19, 2012

Related U.S. Application Data

(60) Provisional application No. 61/433,630, filed on Jan. 18, 2011.

(51) Int. Cl.
 - *G02B 6/10* (2006.01)
 - *G02B 6/26* (2006.01)
 - *G02B 6/42* (2006.01)

(52) U.S. Cl.
 USPC .............. 385/31; 385/15; 385/28; 385/37; 385/129

(58) Field of Classification Search
 USPC ...... 385/1, 2, 15, 28, 37, 39, 49, 50, 129–131
 See application file for complete search history.

(56) References Cited

U.S. PATENT DOCUMENTS 7,260,290 B1 * 8/2007 Greiner et al. ................. 385/37
7,680,371 B2 3/2010 Cheben et al.

OTHER PUBLICATIONS

Bar-Cohen et al., "Thermo-Optic Effects in Polymer Bragg Gratings", Micro- and Opto-Electronic Materials & Structures, vol. 1, ch. 2, p. 67-69, 2007, Springer.
Cheben et al., "A Broad-Band Waveguide Grating Coupler with a Sub-Wavelength Grating Mirror", Photon. Technol. Lett., vol. 18, p. 13-15, 2006.
Cheben et al., "Silicon Photonic Waveguide Structures & Devices", Extreme Photonics & Applications, ch. 2, p. 229-232, 2008, Springer.
Cheben et al., "Refractive Index Engineering with Subwavelength Gratings Implemented in a Highly Efficient Microphotonic Coupler and a Planar Waveguide Multiplexer", Opt. Lett. vol. 35(15), p. 2526-2528, 2010.
Dai et al., "Ridge-Waveguide-Based Polarization Insensitive Bragg Grating Refractometer", Measurement Science and Technology, vol. 17, p. 1752-1756, 2006.

(Continued)

*Primary Examiner* — Charlie Peng
*Assistant Examiner* — Mary El Shammaa
(74) *Attorney, Agent, or Firm* — Jason Davis

(57) ABSTRACT

A waveguide cores consisting of a subwavelength grating permits transmission of light without diffraction in a discontinuous manner, wherein the energy is provided by field hopping between subwavelength material segments of higher index. The use of alternating segments permits design of waveguides having desired effective index, mode confinement factor, birefringence, polarization mode or mode dispersions, polarization dependent loss, thermal sensitivity, or nonlinear optical coefficient. An optical system comprises a waveguide having such a core, clad on at least one side, extending between two ends, and wavelength-limiting optical components in optical communication with the ends.

17 Claims, 4 Drawing Sheets

OTHER PUBLICATIONS

Koos et al., "All-Optical High Speed Signal Processing with Silicon-Organic Hybrid Slot Waveguides", Nature Photonics, vol. 3, p. 216-219, 2009.

Pavesi L., "Silicon-Based Light Sources for Silicon Integrated Circuits", Advances in Optical Technologies, Article ID 416926, 12 pages, 2008.

Peleg et al., "Nonlinear Waves in Subwavelength Waveguide Arrays: Evanescent Bands and the "Phoenix Solition"", Physical Review Letters; The American Physical Society, PRL 102; p. 163902-1-163902-4, 2009.

Schmid et al., "Gradient-Index Antireflective Subwavelength Structures for Planar Waveguide Facets", Opt. Lett., vol. 32(13), p. 1794-1796, 2007.

Schmid et al., "Interference Effect in Scattering Loss of High-Index Contrast Planar Waveguides Caused by Boundary Reflections", Optics Letters, vol. 33(13), p. 1479-1481, 2008.

* cited by examiner

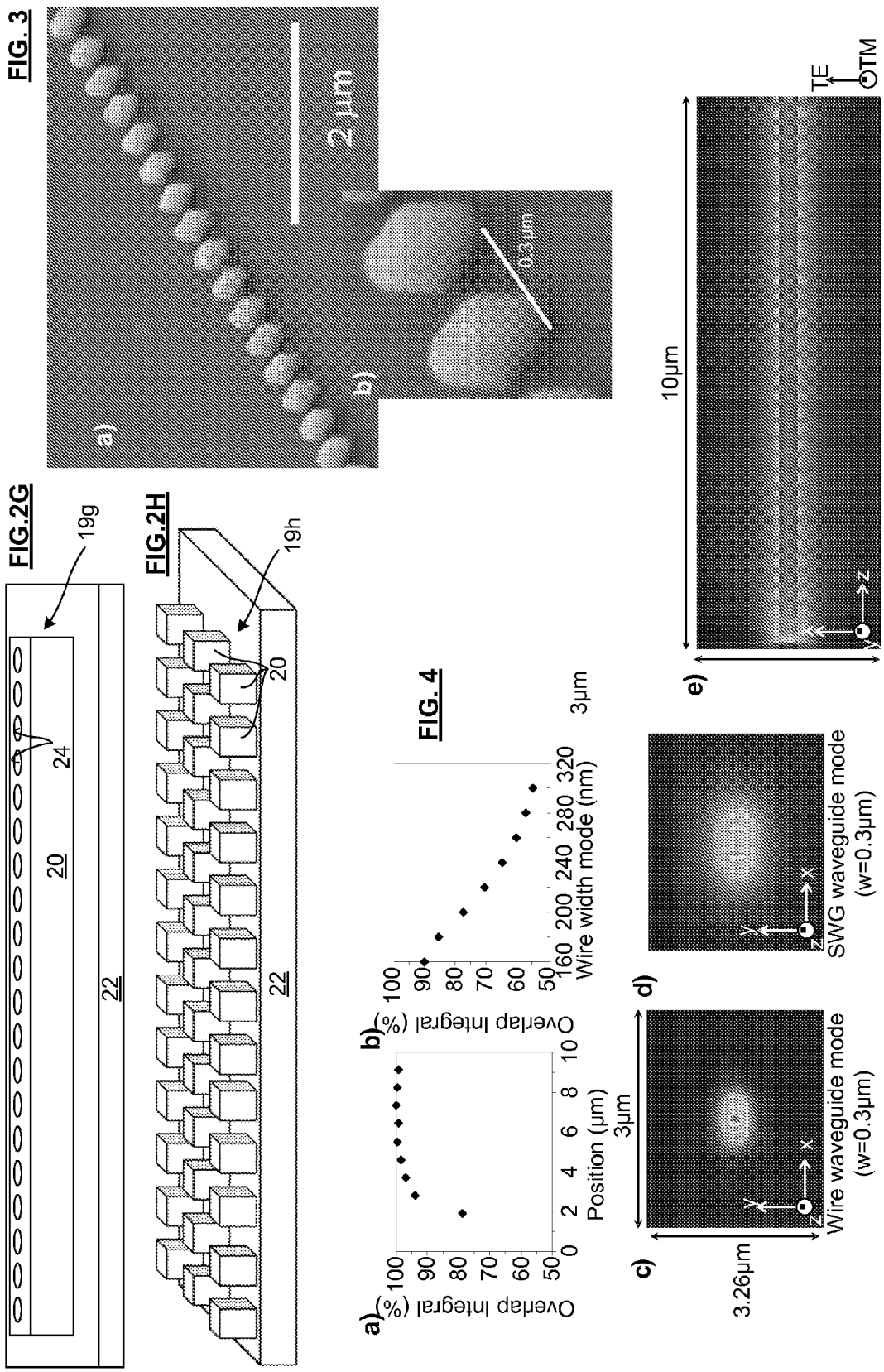

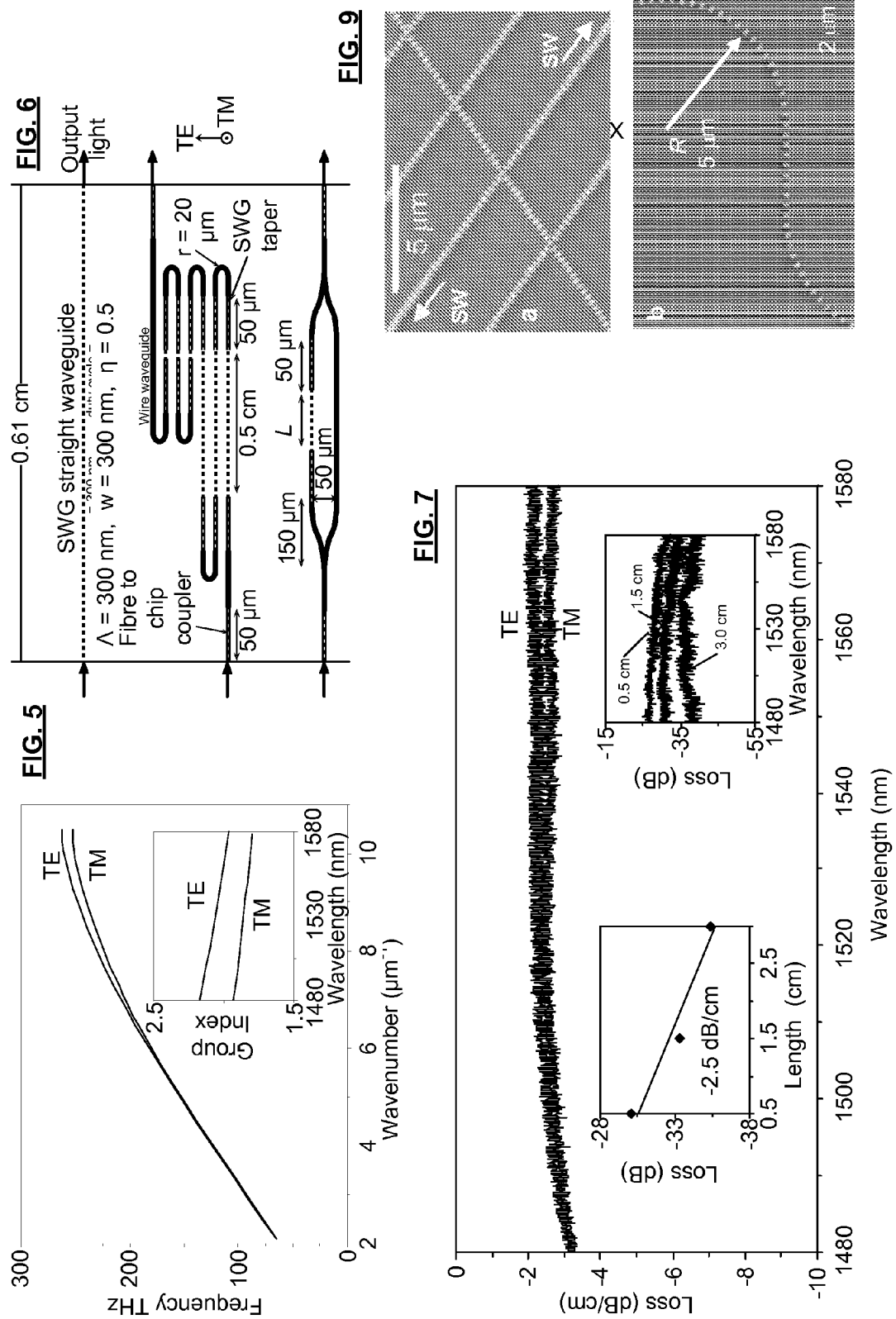

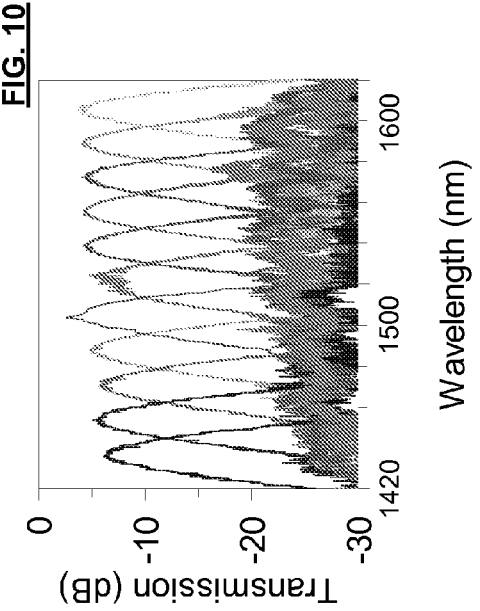
FIG. 10
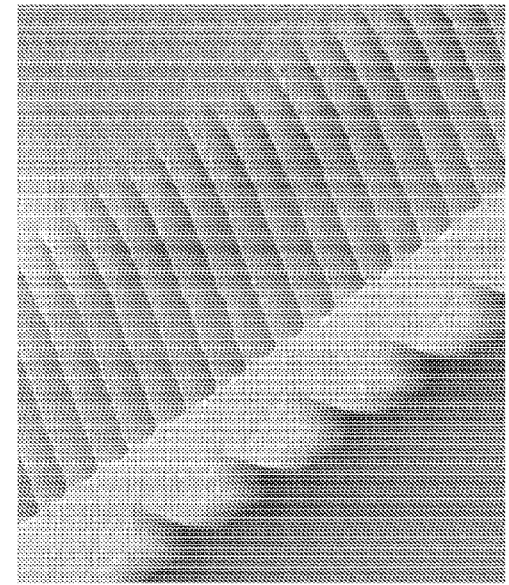
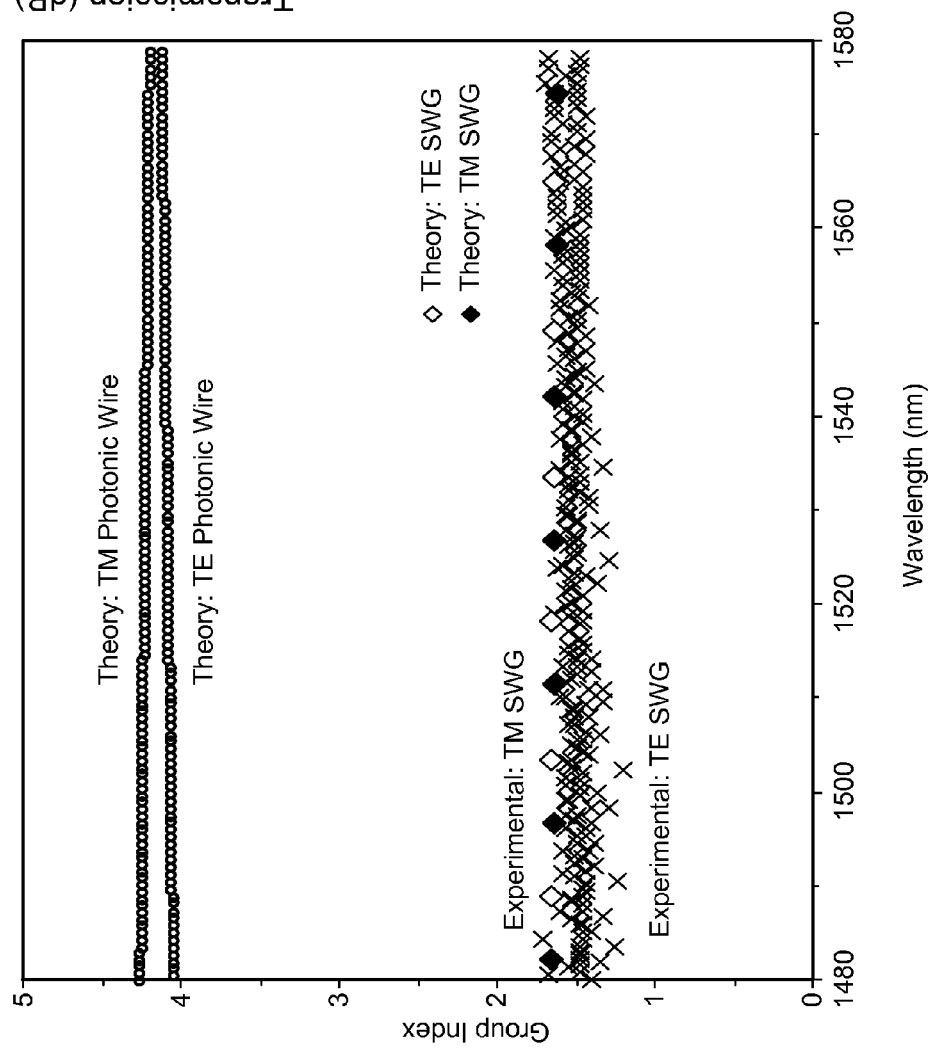
FIG. 8

COMPOSITE SUBWAVELENGTH-STRUCTURED WAVEGUIDE IN OPTICAL SYSTEMS

FIELD OF THE INVENTION

The present invention relates in general to waveguides, and in particular to waveguides formed entirely of at least two materials of differing refractive index, wherein the two materials meet at interfaces substantially along a direction of propagation of the light, wherein adjacent interfaces are separated by a short enough distance to frustrate diffraction of any optical signal that enters the waveguide.

BACKGROUND OF THE INVENTION

Dielectric waveguides have been studied and used for guiding light since the 1920's. Since then optical fibres have been developed and refined to fill an important role in optical telecommunications. A wide variety of semiconductor waveguides are known, fabricated using a variety of semiconductor wafer and optical layer forming technologies. Channel waveguides, photonic wires, and many intricate planar waveguide dielectric structures can be formed on planar surfaces of wafers.

One of the limitations of dielectric waveguides is that desired waveguide properties (index of refraction, dispersion, attenuation, polarization properties, etc.) are limited to those of the fabrication materials. For example, waveguides for microphotonic devices are desired for a wide and growing number of proposed applications. For practical implementation of microphotonic devices, microphotonic waveguides are needed satisfying several constraints, including: low waveguide propagation loss; low polarization dependence; temperature-independent (athermal) operation; and limited mode dispersion. Additionally, it is imperative to design the microphotonic device in a manner that permits efficient coupling of the light into and out of the microphotonic waveguide, that permits miniaturization of the device using reliable design techniques, and to permit microphotonic waveguides with different refractive indices to be fabricated. It is further desirable to provide microphotonic waveguides that can bend and/or criss-cross with negligible loss and crosstalk, to reduce need for vias when constructing optical circuits.

Light can be confined in a dielectric waveguide by index-guiding or by exciting defect states in a periodic lattice. A conventional planar waveguide confines the light in a core, which has a higher refractive index than the surrounding cladding material. There are some problems with miniaturizing this type of waveguide, for example to produce microphonic circuits. It is known that imperfections at the high refractive index contrast boundary between the core and cladding results in light scattering losses that may be critical to many applications. This scattering loss can be minimized by using larger core size ridge waveguides, albeit at the expense of limiting the minimum bend radii of the waveguide to several hundred micrometers, which may not be desirable for leveraging the potential for compact microphotonic structures. For channel waveguides, scattering efficiency can be reduced by using waveguides with a core area that is small enough to delocalize the waveguide mode, such that the field intensity at the core-cladding boundary is diminished or by making use of an inherent interference effect of the scattered radiation (J. H. Schmid, A. Delâge, B. Lamontagne, J. Lapointe, S. Janz, P. Cheben, A. Densmore, P. Waldron, D.-X. Xu, K. P. Yap, "Interference effect in scattering loss of high-index-contrast planar waveguides caused by boundary reflections", Optics Letters, Vol. 33, No. 13, pp. 1479-1481, 2008.) However, large dependence of propagation loss on waveguide geometry, wavelength and polarization have been reported for silicon wire waveguides. Such dramatic changes of loss in silicon wire waveguides are a significant obstacle in building practical microphotonic circuits. Low loss (−1 dB/cm) to −1.7 dB/cm have been achieved for transverse electric (TE) polarization modes. However, square core cross-sections are intentionally avoided to reduce the vertical sidewall height, resulting in optimal TE performance at typical waveguides dimensions of 500 nm×200 nm. The penalty for this optimized waveguide TE performance is that a confined transverse magnetic (TM) mode may no longer be supported by the waveguide (depending on the cladding material used). Since sidewall imperfections originate from the etching process, propagation loss can be reduced by using an etchless process based on selective oxidation, although such waveguides support only TE polarization and insertion loss is significant. Accordingly, there are problems using conventional index-guided solid core waveguides for microphotonic applications, especially those that require polarization independence. Moreover there is limited flexibility regarding materials that provide adequate attenuation, are readily patterned, and provide desirable index and dispersion.

Subwavelength periodic structures were first used in the late $19^{th}$ century by Hertz, when studying radio waves, using a fine grid of parallel metal wires used as a polarizer. In the 1940s electromagnetic wave propagation in a medium structured at the subwavelength scale was first studied, with alternate layers of a dielectric and a metal. Although the subwavelength phenomenon has been known and exploited for many years in free-space optics and recently also in plasmonics, little has been reported of the use of subwavelength structures in dielectric optical waveguides. Subwavelength structures have been used in couplers, Bragg Gratings for wavelength selective reflection and filtering, and for waveguide facets. See [P. Cheben et al., A broad-band waveguide grating coupler with a sub-wavelength grating mirror. *Photon. Technol. Lett.* 18, 13-15 (2006)] and [J. H. Schmid et al., Gradient-index antireflective subwavelength structures for planar waveguide facets. *Opt. Lett.* 32, 1794-1796 (2007)], for example.

Propagation losses for line-defect waveguides in 2D periodic lattices are comparatively large (from −8.0 dB/cm to −4.1 dB/cm) and such waveguides furthermore exhibit large wavelength and polarization dependent loss. Thus again these waveguides are limited, particularly when broadband or polarization independent applications are required.

Several researchers have investigated high index contrast waveguides consisting of alternating index of refraction lines that extend along a direction of propagation of the light [e.g. Nonlinear Waves in Subwavelength Waveguide Arrays: Evanescent Bands and the "Phoenix Soliton" by Or Peleg et al. Physical Review Letters 102, 163902 (2009)]. Large index contrast materials with a subwavelength pitch are disclosed. Bloch modes including extended and self-localized states propagating with an effective index between 0 and 1. Such waveguides have very large interfaces between the different materials as they extend the length of the waveguide. Accurate forming of such waveguide cores is technologically challenging, even at modestly small scales.

Applicant described, in a chapter in Extreme Photonics & Applications by Hall et al. (2008 on p. 229 & seq.), subwavelength silicon structures consisting of alternating refractive index segments. The principle of subwavelength gratings, including the suppression of diffraction, and macroscopic effective homogeneity of the structure during light propagation, are noted. A one dimensional free-space subwavelength grating is illustrated and the effective medium theory is invoked to approximate the index of refraction for waves along two directions in free space. There is no suggestion that waveguides could be fabricated having low loss or other properties that would make them practical waveguides. The chapter goes on to review the known uses of silicon-on-insulator SWG structures, including uses as antireflective coatings (triangular SWG), and mode adapters (chirped SWG).

Bragg gratings are well known structures that incorporate alternating core regions of differing refractive index. It is known that light of lower and higher frequencies than those matching a pitch of the grating pass through the grating with less reflection loss than the frequencies that match the Bragg condition. These devices cannot operate in a system unless light with frequencies matching the Bragg condition are conveyed to the Bragg grating. For example, a paper by Dai et al., entitled: Ridge-waveguide-based Polarization Insensitive Bragg Grating Refractometer teaches a waveguide Bragg grating sensor, and in particular teaches polarization insensitivity of certain Bragg fibre gratings.

Accordingly, while there are a wide variety of waveguides known in the art, and there are structures for reflection and coupling that include subwavelength structures, there is a need for design flexibility in terms of index of refraction, and polarization and wavelength mode dispersions in waveguides, especially waveguides that can be coupled to with low loss, with a variety of waveguides, and can be miniaturized.

SUMMARY OF THE INVENTION

A composite subwavelength-structured waveguide is provided herein, that is unique in that it ideally supports a true lossless mode. Furthermore the composite subwavelength-structured waveguide has advantages of having a novel degree of freedom over prior art waveguides, in the form of a volumetric ratio of two (or more) materials of which the waveguide core is formed. The waveguide can have an effective index of refraction between the indices of refractions of the two or more materials, and can therefore have a tailored index of refraction, without having to create a new material. This degree of freedom (volumetric ratio) can be used to effectively cancel dispersion, mode dependent loss, polarization mode dispersion, thermal dependence, or other propagation characteristics of properties that the two (or more) materials have to opposing degree. For example, athermal waveguides can be created by interlacing materials with opposite polarity thermo-optic coefficients. Waveguide modulators can be tailored using interlacing materials with different electro-optic coefficients. Nonlinear properties can be enhanced by modifying the mode size and interlacing materials.

The lack of diffraction of the waveguide is an initially surprising result, although it follows from the principles of optics. As it is known that losses increase in optical circuits as more interfaces perpendicular to the path of light are added to the circuit, it is counter-intuitive that multiplying the number of interfaces has the exactly opposite effect of suppressing loss of the signal, once the density of interfaces exceeds a limit defined by the wavelength (or band of wavelengths) of the signal and the effective index of the composite subwavelength-structured waveguide.

Accordingly, and optical system is provided, the optical system comprising a component having at least one waveguide extending between respective waveguide ends, formed in part of at least one layer of the component that extends over a substrate of the component, the waveguide comprising a composite subwavelength structured core, and a cladding adjacent to the core, on at least one side; and wavelength-limiting optical elements in optical communication with the waveguide ends, the wavelength-limiting optical elements pass light of wavelengths higher than a cutoff wavelength $\lambda_c$, and do not effectively propagate wavelengths below $\lambda_c$, whereby useful optical signals passing through the waveguide are in one or more linewidths or bandwidths having wavelength(s) greater than $\lambda_c$, wherein:

a. the composite structured core is formed of materials of at least two distinct indices of refraction,
b. a sequence of interfaces defined between the at least two materials that meet at interfaces along a direction of propagation of the waveguide,
c. three sequential interfaces are separated by less than about $½\lambda_c/n_{eff}$, whereby diffraction of the useful optical signals is suppressed, and
d. an effective index of refraction of the material is constant across the waveguide, to the extent that the composite structured core is effectively a homogeneous medium.

The composite structured core may comprise or consist of interlaced segments of the at least two materials with each segment extending the full dimensions of the waveguide core in two transverse directions, and therefore producing interfaces that are the full dimensions of the waveguide core. The composite structured core may comprise a solid inner core that extends the length of the waveguide, and an outer core partially surrounding the solid inner core, the solid inner core having a constant cross-section, wherein the interfaces are provided in the outer core, which is formed of interlaced segments of the at least two materials.

The component may comprise: a substrate having a bottom cladding on which the composite structured core is deposed, which bottom cladding may be composed of one of the at least two materials. The component may further comprise a top cladding, which may be composed of one of the at least two materials. The component may be a semi-insulating wafer substrate with a bottom cladding and core formed by lithographic deposition. The component may include a plurality of waveguides between respective ingresses, egresses, junctions, or optical devices, and two of the plurality of waveguides may cross at a junction. If so, the junction may comprise waveguide segments having cores with reduced mode confinement, whereby loss and crosstalk at the intersection is reduced.

The wavelength limiting element may be operable to preclude light having a wavelengths lower than 1000, 800, 600, 400, 300, 200, or 100 nm. A the first and second materials may form a periodic or aperiodic pattern, in a one or two dimensional array.

An effective refractive index of the waveguide may be chosen by selecting a fixed ratio of the at least two materials. The waveguide may be designed so that the volume ratio of the waveguide core is selected to provide a desired electric field strength within the core. The at least two materials may be chosen having wavelength dispersion coefficients, thermal refractive index coefficients, polarization mode dispersions respectively to provide for a desired dispersion, thermal sensitivity, or polarization mode dispersion for the waveguide.

One of the at least two materials may be: a nonlinear optical material, for example alterable by mechanical pressure, electric, magnetic or electromagnetic field to change a phase, or a complex amplitude of light passing therethrough. As such the component may comprise electrodes, or may be coupled to a seed or pump source, and accordingly the component may be an optical modulator, amplifier or laser.

The component may further comprise a mode adapter at one of the ends, the mode adapter comprising a composite structured segment like the waveguide in that it is formed of the at least two materials, includes a sequence of interfaces between the materials oriented substantially perpendicular to a direction of propagation, with three sequential interfaces being separated by less than about $\frac{1}{2}\lambda_c/n_{\mathit{eff}}$ but differs from the waveguide in that an effective index of refraction of the material changes continuously constant across the mode adapter.

The wavelength-limiting component may comprise: a photodetector, a laser, a mode adapter, a lens, a detector, a sensor, a coupler, a filter, a coating, a dichroic mirror, VCSEL, a light emitting diode, a coherent, partially coherent, or incoherent light source, an interconnecting waveguide, a modulator, an optical amplifier, an optical fibre, a diffraction grating, or a subwavelength grating.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 3a),b) are microscope images of a SOI core suitable for fabricating a waveguide in accordance with the present invention;

FIGS. 4a),b),c),d),e) are graphs and simulations showing propagation properties of waveguides of the present invention;

FIG. 5 graphs dispersion and group index for TE and TM modes of a simulated SWG waveguide;

FIG. 6 schematically illustrates optical paths on a chip used to test the present invention;

FIG. 7 graphs measured loss as a function of wavelength of transmission for the SWG waveguide;

FIG. 8 graphs theoretical and observed TM and TE group index as a function of wavelength for SWG waveguides, and includes, for reference, theoretical TM and TE modes for photonic wires;

FIG. 9 are images showing cross-connects and bends in SOI SWG waveguides; and

FIG. 10 shows an image of a spectrometer incorporating a waveguide in accordance with the present invention, and showing a graph of the transmission properties of the spectrometer.

DESCRIPTION OF PREFERRED EMBODIMENTS

Herein Applicant teaches a composite subwavelength-structured waveguide core consisting of segments of at least two materials, in which interfaces between adjacent index contrasting material segments are: perpendicular to the direction of the waveguide; and separated by a subwavelength distance. The composite subwavelength-structured waveguide is provided for use in an optical system that includes wavelength-limiting elements that preclude a Bragg condition being met when the waveguide is in use. The subwavelength spacing ensures that diffraction is suppressed. The design may facilitate miniaturization, as is desirable for microphotonics applications. The intermittent nature of the waveguide facilitates bends, and a simple interconnect for low loss, low cross-talk criss-crossing of such waveguides is provided.

Figure 1:
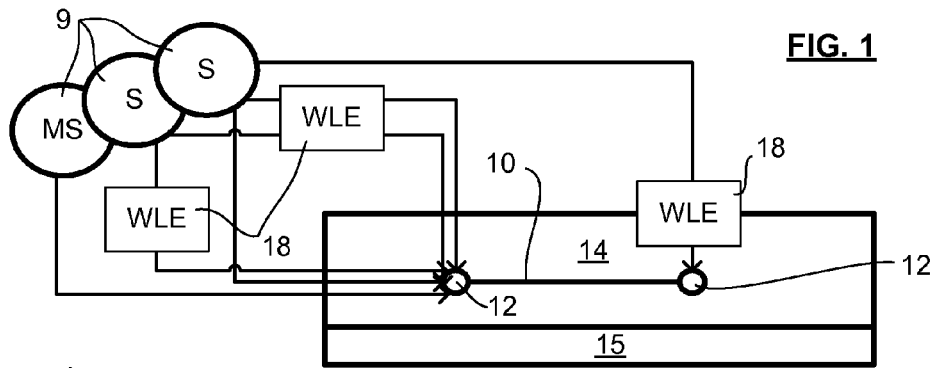
FIG. 1 is a schematic illustration of an optical system in accordance with an embodiment of the invention.

FIG. 1 is a schematic illustration of an optical system in accordance with an embodiment of the invention. The optical system includes at least one optical source 9, and at least one composite subwavelength-structured waveguide 10 that extends between two ends 12, defined on a layer of a structured, layered component 14. The sources 9 may be: natural luminous bodies, reflections, or conventional light sources such as lasers, LEDs, superluminiscent diodes, supercontinuum sources, lamps, and other lights; coherent, partially coherent, or incoherent; broadband or narrowband; polarized, partially polarized, or unpolarized; and simple or compound emitters. The composite subwavelength-structured waveguide 10 is non-resonant. The system includes various optical paths interconnecting the sources 9 with the ends 12.

Component 14 includes a substrate 15 for the waveguide 10. A plurality of layers of optical components may be stacked on the substrate 15 to provide the component 14. The ends 12 are shown at arbitrary points in the component 14, but may be adjacent to a photodetector, a laser, a mode adapter, a lens, a detector, a sensor, a coupler, a filter, a coating, a dichroic mirror, vertical cavity surface emitting laser, a light emitting diode, another source, an interconnecting waveguide, a modulator, an optical amplifier, an optical fibre, or a diffraction grating, for example, which may be embedded into the component 14, or coupled thereto in a known manner. Specifically, the end 12 may be efficiently coupled to a mode adapter in the form taught in Applicant's issued U.S. Pat. No. 7,680,371, the contents of which are incorporated herein by reference. The component 14 may define some, substantially all, all or none of the optical paths 16, depending on the embodiment. The optical paths 16 formed in the component 14 may also be composite subwavelength-structured waveguides, may be photonic wires, or photonic crystals, or may be other waveguides, and the component 14 may comprise a large or complex network of waveguides.

Each path between any of sources 9 and either of the ends 12 includes a wavelength limiting element (WLE) 18. The waveguide 10 is designed for transmitting light wavelengths (in one or more bands or lines) higher than a cutoff wavelength $\lambda_c$. WLEs 18 preclude usable light signals from entering the waveguide 10 if the light is susceptible to Bragg reflection. It will be appreciated by those of skill in the art that WLEs 18 can be provided in a wide variety of ways, and can be provided incidentally by a variety of components singly, or in combination. For a wide range of applications, sources used deliver a predefined range of wavelengths and therefore sources generally provide wavelength limits by default. So the WLE 18 may be built directly into a source 9, or may be an intrinsic property of the source, such as a monochromatic source (MS) 9 shown. Furthermore, the WLE 18 may be built into the component 14 or a waveguide or other component interconnecting the source and the waveguide 10. A wavelength or band of wavelengths for which a system is made or to which it is suited, is typically used to provide high optical efficiency, low cost, elements, as generally the costs increase with increasing bandwidth to which the system is suited. The WLEs may be provided by lensing, chromatic reflection/refraction, thin film multireflection, and/or other resonance-based wavelength varying structures, all of which are well known in the art. The WLEs 18 may be, or include, a dichroic mirror, or a thin film coating (reflective or transmissive), a lens and aperture for selectively focusing light of a given wavelength band onto the aperture, a diffraction grating or a bandgap device, or any combination thereof. Each of these can provide an effective filter for the respective sources, propagating wavelengths above $\lambda_c$, while substantially blocking signal components of wavelengths lower than $\lambda_c$.

The composite subwavelength-structured waveguide 10 is defined in the component by at least a structured core, and preferably a cladding layer between the core and substrate 15, unless the substrate itself serves as a cladding. The structured core includes segments of two materials of differing refractive index. The segments are separated by a distance that frustrates diffraction of light signal that can be conveyed across the waveguide 10. This minimum separation ($s_m$) required to frustrate diffraction is given by the following equation: $s_m = \lambda_c/2n_{eff}$, where $n_{eff}$ is the effective index of the waveguide mode in the composite core. Interfaces between the segments are separated by a given distance. The requirement for frustrated diffraction is that three successive interfaces are smaller than $s_m$. Typically the waveguide 10 will be surrounded by a cladding, and protected and packaged in a manner known in the art. Optionally, the cladding material can be identical to one of the materials comprising the composite core. The waveguide 10 may be fabricated using known semiconductor fabrication techniques, which are valuable because of their reliability, quality assurances, cost, industrial scalability, and suitability for miniaturization.

Figure 2A:
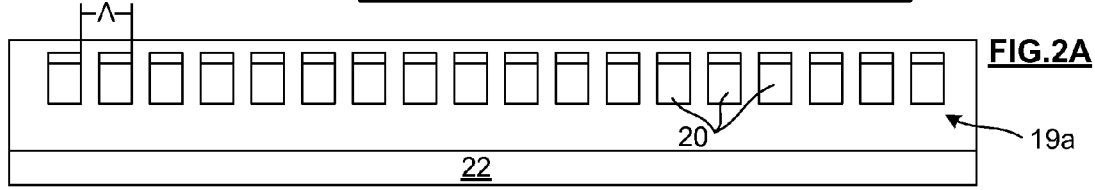
FIGS. 2A,H are schematic illustrations of composite subwavelength-structured waveguide cores in accordance with embodiments of the invention.

FIGS. 2A-H schematically illustrate four embodiments of core structures 19 for composite subwavelength-structured waveguides in accordance with embodiments of the present invention. FIG. 2A shows a composite subwavelength-structured waveguide core 19a having a standard subwavelength grating (SWG) core defined by a periodic array of segments 20 on a bottom cladding 22, which is supported by the substrate 15 of FIG. 1. Each segment extends the entire width and height of the waveguide core it forms. A pitch Λ of the grating structure is smaller than $s_m$. As shown, this structure has air as upper clad while it is clad by the cladding 22 from the bottom, and air is the second material of which the core is formed. Of course other materials (solid, fluid or gaseous) or a vacuum can be used as the upper cladding to form a different waveguide, and the index of the material could be varied to tune the effective index of refraction, dispersion, or other properties of the waveguide.

Figure 2B:
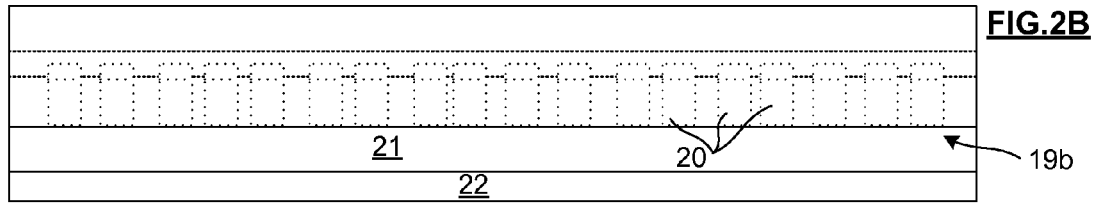

FIG. 2B is differs from FIG. 2A in two respects: it has a top cladding of a second material, which also fills spaces between the segments 20 within the core (shown in ghost view); and the segments 20 are aperiodic. In many applications, a second material 21 (either solid, liquid or gaseous) may be provided to fill the spaces between the segments 20 of waveguide cores 19 shown in FIG. 2A, or in the core embodiments described below, with a material having different index of refraction than that of the segments 20. The second material 21 may be applied to surround the core to additionally provide top and side cladding for the waveguide 10. The second material 21 may be of the same composition as the cladding 22. The top, bottom, and two side claddings, first and second materials may each be of different respective compositions, or the structure could be composed of as few as two components with all claddings and the second material being the same.

While it is conventional to use a periodic structured core, it is not essential to the present invention. FIG. 2B schematically illustrates a waveguide 19b with a core consisting of an aperiodic array of segments 20 on the cladding 22. The aperiodic array shown includes segments of uniform thickness separated by a distance that varies randomly or pseudo-randomly between a minimum and maximum separation. As the array is aperiodic, there is no pitch for this structure, however the maximum separation between two successive segments is smaller than $s_m$. Such a waveguide will suppress diffraction for all wavelengths greater than $\lambda_c$. To produce an effectively homogeneous medium, the volume ratio must be sufficiently constant. A drift in the volume ratio will impact light propagation within the waveguide, attenuating some modes and introducing others. Preferably, the index of refraction is effectively constant over a distance that is suitable for the application. For example, the volume ratio over any span of the waveguide longer than k times $s_m$ (for k=100, 10, 5, or 1) may be constant, or the probability of such a span being within 1/100 or 1/1000 of the volume ratio may be 98%. To the extent that spans of the waveguide vary locally, their variance is not ordered so as to generally compound the spatial variability of the volume ratio. It will be noted that the thickness of both materials can covary, and doing so, the volume ratio spanning successive segments may be made constant.

Figure 2C:
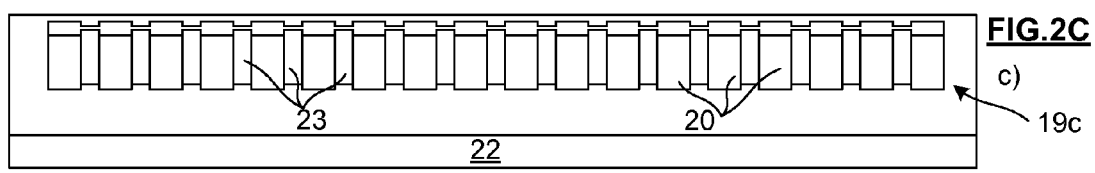

FIG. 2C schematically illustrates a third waveguide core 19c similar to waveguide core 1a except that bridging sections 23 are provided between the segments 20 to provide a higher concentration of the first material. The bridging sections 23 are aligned and concentric with the waveguide core, and so the core could be characterized as having an inner core and an outer core: the inner core being solid, and the outer core being segmented with alternating material 1 and material 2 segments. This structure is essentially a sidewall etched SWG.

While FIG. 2C shows the inner core running the vertical extent of the waveguide core, this is not essential, and it could extend the horizontal extent of the waveguide core (although this may be more difficult to fabricate), or may not run the entire horizontal or vertical extent, forming a core in two directions. This bridging technique thus provides a mechanism for producing a high volume ratio while keeping the separation $s_m$ as small as desired, without requiring very small spacing of the segments, which may be difficult to achieve. Typically the core is preferred to be formed of the higher index material, to provide the index guiding mechanism. It will be noted that similar bridging elements may be added to other core designs shown here.

Figure 2D:
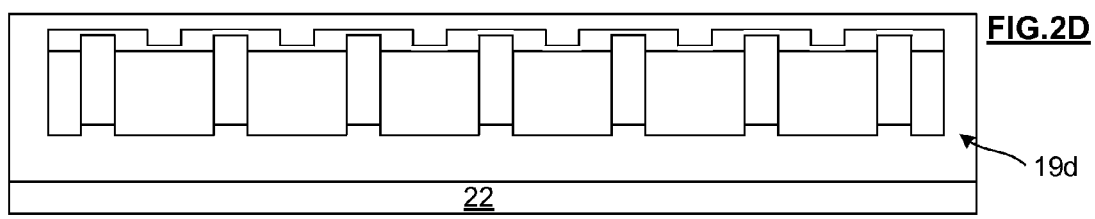

FIG. 2D schematically illustrates another embodiment of the waveguide core 19d. Waveguide core 19d can be viewed as (free-space) segments of a second material that do not extend the width of the core, or that the segments 20 are bridged on alternating edges of the core. It will be seen that a variety of designs are possible with varying complexity, but in each case the pitch, or effective minimum spacing, is less than $\lambda_c/2n_{eff}$.

Figure 2E:
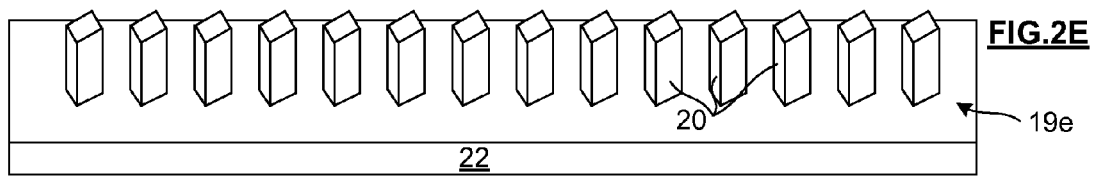

FIG. 2E schematically illustrates a further waveguide core 19e, in which interfaces between segments are not perpendicular to the direction of propagation. The segments are diamond-shaped and oriented so that the planar interfaces are oriented at an angle with respect to the direction of propagation. It will be appreciated that arbitrary polygon cross-sections can be provided for pillars 20, and asymmetries of the profiles permit varying orientations or profiles between adjacent pillars, all of which should have negligible effect on mode propagation characteristics. By employing such structures, a birefringence axis of the composite material can be rotated and thereby used to control mode polarization.

Figure 2F:
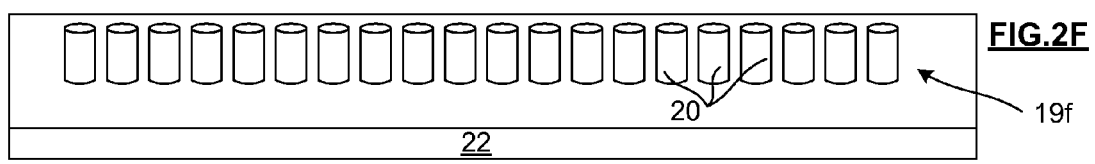

FIG. 2F schematically illustrates a further waveguide core 19f, in which interfaces between segments are not planar walls. The segments are formed of cylindrical pillars, although the cross-section of the pillars need not be circular as shown, but could be of any specific form desired.

FIG. 2G schematically illustrates a further waveguide core 19g consisting of a solid waveguide bearing cylindrical bores 24. It will be appreciated that waveguide core 19g is related to that of FIG. 2F, with first and second materials being reversed. It will be appreciated that such inversion could be applied to the design of any of the cores shown and described above.

While the foregoing waveguide cores were all linear waveguides, FIG. 2H schematically illustrates a two-dimensional waveguide core consisting of a staggered array of blocks or pillars 20 (which could have a variety of cross-sectional forms). While the staggering illustrated is square, and so is ideal for 2D waves propagating in a linear direction, it will be appreciated that other patterns could be used (triangular or other polygon, circular, oval) to provide effective waveguiding for a variety of 2D propagating modes. It will be noted that the structures known in the art for photonic crystals are all equally applicable here, except that the introduction of a defect in the lattice is unnecessary, and no bandgap functioning is required.

The segments 20 of any of the waveguide cores 19 may alternate in composition, or otherwise have different dimensions, profile, or composition that provide a pattern that remains subwavelength with respect to the light that can be transmitted on the waveguide 10.

In a composite subwavelength-structured waveguide with a core consisting of a periodic, quasi-periodic, or aperiodic arrangement of silicon and silica segments, light excites a Bloch mode, which can theoretically propagate through the segmented waveguide without any losses caused by diffraction into radiative or cladding modes. Therefore, one composite subwavelength-structured waveguide design is provided having a low insertion loss in both TM and TE modes. A detailed example of this is provided in the example section below. It will be appreciated that suitably low insertion loss can be provided with a variety of other desirable features.

It is relatively straightforward to produce a waveguide having athermal operation. For example, temperature-insensitive (athermal) waveguides can be provided by combining two dielectric materials with opposite thermal refraction coefficients (dn/dT) or polarization dependent losses, into composite subwavelength-structured waveguides.

As an example for averaging thermal coefficients, the thermal change of the effective index $\partial n_{eff}/\partial T$ for the type of segmented silicon waveguide shown in FIG. 2a with cross-sectional dimensions of 260 nm×450 nm, when SU-8 polymer is used as a top cladding material, as well as the second material penetrating the periodic gaps between the segments. Using the known thermo-optic coefficients of the constituent materials (silicon: $\partial n/\partial T=1.9\times 10^{-4}$ K$^{-1}$ and SU-8: $\partial n/\partial T=-1.1\times 10^{-4}$ K$^{-1}$, measured at 1.55 µm telecom window, athermal waveguide behavior ($\partial n_{eff}/\partial T=0$) can be achieved for a silicon duty ratio of 57% and 82% for TE and TM polarized light, respectively.

If the waveguide is designed for use in a particular optical system, it may compensate for a predefined thermal sensitivity by producing a corresponding thermal sensitivity. While this could be performed by providing multiple waveguides of chosen lengths, mode adaptations between these waveguides will increase the loss. As other volume ratios can be provided without changing the materials used, substantial advantages are provided by using composite subwavelength structured waveguides.

The "Handbook of optical constants of solids", (Palik, vols. 1-3, Academic Press), the contents of which are incorporated herein by reference, teaches a wide variety of properties of many optical materials for building systems. Designing composite subwavelength structured waveguides is not quite as easy as randomly picking compositions having desired properties from this section, as practically all materials are associated with preferred fabrication routes, that have limitations on dimensions, purity, and smoothness of the segments/pillars, but in principle any combination and permutation of materials produce waveguides having properties that result from the selection and patterning of the materials.

For example, the composite subwavelength-structure principle can be applied specifically for designing: group dispersion-free waveguides, by selecting a volume ratio for two or more materials having opposite dispersion curves; a desired polarization dependent loss, or polarization independent loss waveguides, in the same manner; or waveguides having a desired birefringence (including none), by alternating materials, or the same material having different refractive index anisotropy (birefringence).

To obtain a waveguide with any specific property, designing the waveguide involves choosing two (or more) materials having divergent values for the desired property. A volume ratio is then chosen so that the values weighted by the volume ratio, sum to the desired total value of the property, when the property varies proportionally to the optical path length through the materials.

For some optical properties, a simple ratio does not govern the property manifested by the waveguide. For example, a group index of a composite subwavelength structured waveguide does not correspond to the group indices of the bulk constituent materials, weighted by the volume ratio. Nonetheless such properties are still dependent on the pattern and materials of the waveguide, and can be designed. As group index is derived directly from the dispersion of the waveguide $\partial \omega/\partial k$ which is largely determined by the waveguide geometry, the group index can be controlled by subwavelength structuring.

It will be appreciated that, as the number of materials increases, the number of linearly independent variables increases, and so does the number of desired properties can be optimized concurrently. At the same time, in general, the greater the number of materials, the more complex the fabrication process.

Since optical gain is governed by the imaginary part of the complex refractive index, refractive index averaging by subwavelength patterning is also applicable to optical gain. Therefore a waveguide with optical gain may be made by selecting a first or second material that exhibits optical gain. Several suitable materials are known to have optical gain when pumped optically by a light source, or electrically driven by electrodes arranged beside or above and below the waveguide, for example. For example, erbium doped silica, which is typically used in erbium doped fiber amplifiers (as well known in the art), could be used as a cladding and as the second material. Other materials that are suitable to provide gain are silicon nanoclusters in a dielectric matrix with, or without erbium doping as discussed in "Silicon-based light sources for silicon integrated circuits", (Pavesi, Advances in Optical Technologies, Article ID 416926 (2008).

Koos et al., "All-optical high-speed signal processing with silicon-organic hybrid slot waveguides" (Nature Photonics 3, 216-219 (2009)) teaches that significant optical nonlinearities can be induced in "silicon slot waveguides" by using a nonlinear organic material inside the slot of the waveguide. These waveguides are shown to be suitable for high speed signal processing. This effect could be significantly enhanced in our invention, by defining the first material segments in silicon, and filling the gaps with various optically nonlinear organic or inorganic materials. An advantage to using composite subwavelength structured waveguides instead of slot waveguides, is the latter are known to require very narrow slot widths for good mode overlap with the cladding material. Such narrow slots are difficult to fabricate and to fill with the nonlinear optical material. Furthermore subwavelength grating waveguides allow for control of the waveguide group index (by the volume ratio), which is beneficial for high speed signal processing.

EXAMPLES

Applicant has demonstrated SWG waveguides on silicon. Silicon is a preferred waveguide material in the near-infrared due to its high dielectric permittivity, which allows compact photonic circuits to be made, with the added advantage of leveraging the vast manufacturing infrastructure developed by the silicon microelectronics industry. SWG is a relatively easy to produce composite subwavelength-structure. A typical SWG silicon waveguide core (prior to SU8 in-fill) of our experiments is shown in FIGS. 3a,b. The waveguide core was a linear periodic array of rectangular segments etched from a 260-nm-thick single crystal silicon layer of a silicon-on-insulator (SOI) wafer. A 2-μm thick bottom oxide ($SiO_2$) layer separates the waveguide from the underlying silicon substrate, to form a bottom cladding. The nominal structural period of the SWG was d=300 nm, which is less than a half of the effective wavelength of the waveguide mode $\lambda_{eff}$ ($\lambda_{eff}=\lambda/n_{eff}$) for which the waveguide was designed. The core is a composite medium formed by interlacing the silicon segments with SU-8 polymer (refractive index of ~1.58). Nominal segment dimensions of 300 nm (width)×150 nm (length) with a 150 nm gap were chosen, although the electron beam lithography techniques used can produce dimensions from 10 μm to 10 nm.

To avoid the formation of standing waves due to Bragg scattering, nominal structural parameters are chosen as Λ=300 nm, w=300 nm and a=150 nm, where Λ is the grating period, w is the segment width and a is the segment length. The pitch (Λ=300 nm) is less than a half $\lambda_{eff}$, while w and a were chosen to delocalize the mode, reducing the field intensity at the core-cladding boundary, as explained in the modeling section below. These parameters minimize loss and wavelength resonances due to diffraction effects and allow for single-mode operation with direct control of the mode confinement. Scattering loss depends first on the amplitude of the current source, corresponding to the defect volume element interacting with the local electric field. The cumulative scattering loss depends on the spatial distribution of these scattering sources. A subwavelength grating minimizes the source amplitude by delocalizing the mode, resulting in less electric field interaction with the volume defect. The cumulative scattering loss (from all sources) is reduced because each source amplitude is diminished due to expansion of the mode, and because the gaps in-between the silicon segments shorten the interaction length.

Modelling

The subwavelength grating (SWG) structures were designed using a three-dimensional fully vectorial Finite Difference Time Domain (FDTD) method. The relative dielectric permittivity of the Si slab was taken as 12.08 and for the SU-8 cladding as 2.5. Typical simulation window dimensions were 20 μm in the propagation direction (z) and 3 μm×3 μm in the transverse directions (x and y). To ensure numerical stability of the algorithm, the time resolution was chosen to be $1.67 \times 10^{-17}$ s, according to the Courant limit. The spatial resolution grid ($\Delta x, \Delta y, \Delta z$) was set to $10 \times 10 \times 20$ nm³ and the simulations ran for a total of 20,000 time steps. The coupling efficiency was calculated as $\eta = \Gamma P_2/P_1$, where $P_1$ and $P_2$ are the Poynting vectors at the input and output interfaces of the SWG structure, respectively, and $\Gamma$ is the spatial overlap integral of the field intensity calculated at the SWG output interface with the fundamental mode of the output waveguide.

A simulation of a silicon photonic wire waveguide was also performed for comparison with the SWG waveguide. These comparison simulations were done on a layout size of $3 \times 3.26 \times 10$ μm³ having a mesh resolution of $10 \times 10 \times 10$ nm³. Material refractive indices used were $n_{Si}=3.476$ and $n_{SiO_2}=1.444$ and the simulation time step is $1.67 \times 10^{-17}$ s according to the Courant criterion. The simulated SWG waveguide consisted of a 10 μm long grating with Λ=300 nm, w=300 nm and a=150 nm. The photonic wire waveguide (width of 300 nm) is used to excite the SWG waveguide Bloch mode at λ=1550 nm for TE polarization. The mode profile of the SWG is recorded at the center x-y plane every $4^{th}$ grating segment (0.9 μm spacing). To estimate the steady-state mode profile of the SWG waveguide (in the center of a grating segment), the overlap integral of each recorded mode profile is calculated with the mode profile 4 grating segments back. Steady-state behaviour is assumed when this mode overlap integral is near-constant and approaches unity. FIG. 4a) shows the calculated mode overlap integral, as a function of mode profile position (z-coordinate). The overlap integral shows >99% overlap at steady-state, beyond about 5 μm from an initial plane. This overlap integral was computed for a SWG having SU8 and $SiO_2$ segments with a pitch of 300 nm, and 50% duty cycle.

Using this SWG mode profile, the overlap integral with a photonic wire waveguide of varying widths (160 nm-300 nm) was calculated to determine an optimal delocalization of the mode. FIG. 4b) shows that the SWG mode profile (w=300 nm) has only a 56% overlap with an equivalent 300 nm wide photonic wire waveguide. However, the SWG waveguide mode profile has a ~90% overlap with a 160 nm wide photonic wire waveguide, indicating that the SWG mode is significantly more delocalized.

Mode profiles for a 300 nm wide photonic wire waveguide and SWG waveguide are shown in FIGS. 4c),d), respectively. The propagating field along the SWG waveguide is shown in FIG. 4e).

Using the approximation of mode size from long-period waveguide gratings, the refractive index contrast of a periodic waveguide $\Delta n$ is equivalent to an effective refractive index contrast of a uniform waveguide by $\Delta n_{eff} = \eta \Delta n$ (or, more generally, if the index contrasts of the two materials $n_1$ and $n_2$ were different $\eta \Delta n_1 + [1-\eta]\Delta n_2$), where η is the duty cycle (50% in our case). Assuming silicon segments and silica cladding, $\Delta n_{eff} \sim 1$ resulting in a 300 nm wide waveguide with $n_{clad}=1.444$ and $n_{core}=2.46$. Such a uniform waveguide has a 96% overlap with the steady-state SWG mode profile, indicating good agreement with this approximation. These results suggest that because the mode is expanded, the scattering loss due to sidewall fabrication imperfections is reduced for the SWG waveguide. Thus the simulation produced optimal values for an embodiment to be tested.

The group index of the nominal SWG waveguide were calculated using the MIT photonic bands (MPB) frequency-domain software with a layout size of $2 \times 2 \times 0.3$ μm³ having a mesh resolution of $20 \times 20 \times 20$ nm³. In FIG. 5, the dispersion relation for the TE and TM modes of the SWG waveguide is plotted. The group index shows a substantially linear frequency as a function of wavenumber from 2-6 μm⁻¹, that is nearly equal for both polarization modes, and a flattening of the dispersion with increasing wavenumber β as the Bragg condition (bandgap) is approached, as would be expected. Due to the subwavelength modes applied to the grating, the operating frequency is well below this flat dispersion region, as indicated in the FIG. 5. The group velocity of the propagating Bloch mode is given by the slope of the dispersion curve. The group index $n_g$ of the TE and TM modes of the SWG waveguide is shown in the inset of FIG. 5 as a function of wavelength. The group index varies in the range 2.2-2.0 for the TE and 2.0-1.8 for the TM modes over the wavelength range of λ=1480-1580 nm (~6.3-6.7 $\mu m^{-1}$ wavenumbers). The calculated group index is almost identical to the calculated effective index of the waveguide mode, confirming the absence of slow-light or resonant effects of the grating on the light propagation, in contrast to photonics crystal waveguides. Using known lithographic techniques features of 10 nm dimensions can be produced. For a such wavelengths the duty cycle could range from 3-97%. The group index at 30% duty cycle was found to be 1.3, which varies widely from the 4.3 group index for a solid Si core. Thus the volume ratio provides a user selectable parameter for customizing group index of the engineered composite subwavelength structured waveguide.

Fabrication

The waveguides were fabricated using electron-beam lithography patterning and a plasma etching process known in those arts. Straight SWG waveguides were fabricated with a length of 0.61 cm (equal to the chip length). Samples were fabricated from commercial silicon-on-insulator (SOI) substrates with 0.26 μm thick silicon and 2 μm thick buried oxide (BOX) layers. Electron beam lithography was used to define waveguide patterns in high contrast hydrogen silsesquioxane (HSQ) resist, which forms $SiO_2$ upon electron beam exposure. The patterns were then transferred into the silicon layer by inductively coupled plasma reactive ion etching (ICP-RIE) using a mixture of $SF_6$ and $C_4F_8$ gases. The samples were coated with a 2-μm-thick SU-8 polymer layer (upper cladding) with a refractive index of ~1.58 at 1.55 μm wavelength, by a standard spin and bake procedure. Finally, the samples were cleaved into individual chips and the facets were polished to an optically smooth finish. FIGS. 3a),b) are images of the core structure. FIG. 6 schematically illustrates the layout of select waveguides patterned.

Characterization

To estimate the SWG waveguide loss, light was coupled to a set of test waveguides of different lengths varying from 0.5 to 30 mm, located on the same chip. FIG. 6 is a schematic illustration of an optical circuit including 5 instances of a SWG waveguide tested. In these test structures, silicon wire waveguides (450×260 $nm^2$) are coupled to SWG straight waveguides using custom-made 50 μm long adiabatic transformers. These transformers were custom couplers, similar to mode coupling disclosed in Applicant's patent application noted herein above, although slightly improved with the use of bridging elements. Several independent circuits are produced on the chip, although only 3 are schematically illustrated. A first SWG section is 0.5 cm long with a constant pitch (Λ=300 nm), width (w=300 nm) and duty cycle (50%). An identical adiabatic transformer section is used for the transition back to a photonic wire waveguide. A second circuit includes three (of up to 7) interconnected 5 mm SWG waveguides. Wire waveguide U-bends of radius 20 μm are used in the test structure to interconnect the three 5 mm SWG straight waveguides on the chip. Test structures of the second kind have various numbers of SWG straight waveguide lengths with a pitch range of 300-400 nm, but all have identical wire lengths, numbers of bends, adiabatic transformers and fiber-chip couplers. Therefore the cumulative loss due to these elements is constant for each test structure, and will not affect the SWG loss measurement. Finally the chip includes a Mach-Zehnder Interferometer (MZI), used to determine the group index of a SWG straight waveguide. The reference arm is comprised of a wire waveguide (450×260 $nm^2$), while the signal arm is comprised of a 50 μm SWG taper followed by a SWG (Λ=300 nm, w=300 nm, duty cycle 50%) with length L=1000 μm, and an identical SWG taper to transition back to wire waveguide. The MZI uses a 50:50 y-splitter implemented with two 150-μm-long and 25-μm-wide s-bends.

Scanning electron microscope (SEM) images of fabricated structures, including a SWG straight waveguide, and detail of the grating segments are shown in FIG. 3. From the SEM images it was determined that a fabrication bias of 50 nm was present. Therefore the actual dimensions of the SWG were Λ=300 nm and w=250 nm with a duty cycle of 33%. Actual wire waveguide width was 400 nm.

Light was coupled from a broadband (wavelength λ=1530-1560 nm) erbium-doped fibre amplified spontaneous emission (ASE) source with a polarization controller into these subwavelength grating waveguides. To minimize the fibre-chip coupling loss, a lensed fibre with a conical tip was used, producing a Gaussian beam waist of ~2 μm and subwavelength grating couplers with a 350 nm width at the input and output facets of the chip were used. The output signal was collected by either a single mode optical fibre or a microscope objective that images the output aperture of each waveguide onto an InGaAs photoreceiver.

A tuneable external cavity semiconductor laser was used instead of the ASE source for the measurement of transmission spectra. The measured loss is shown in FIG. 7. The losses for TM and TE modes are low, and over the shorter wavelengths, are very similar. Loss was determined from the slope of a linear fit of transmitted power vs. SWG waveguide length. The typical propagation loss of the SWG waveguide was −2.5 dB/cm, which compares favourably with losses of other microphotonic waveguides. The polarization dependent loss is less than 0.5 dB for the wavelength range shown. It is remarkable that such low loss is achieved for light propagating over a 1 cm distance through more than 33,000 boundaries between high- and low-refractive-index segments having an index contrast of Δn~1.9. While this finding is consistent with Bloch mode theory, it is believed that this low loss is a direct consequence of the mode delocalization from the composite core with a corresponding decrease in light scattering at fabrication sidewalls imperfections, as found with the FDTD simulation mode profiles. A first inset shows loss as a function of length for the three specific measurements. A second inset shows loss spectra for the three specific measurements.

To confirm the loss measurements obtained with the ASE source, we repeated the same measurements on the loss test structures using the tuneable external cavity semiconductor laser. The loss values obtained using the single wavelength source fluctuated randomly from one wavelength to another, due to Fabry-Pérot cavity effects arising from the different elements of the test structure (wires, bends, taper and couplers). However, the worst case propagation loss estimate in the C-band (λ=1530-1560 nm) of −3.0 dB/cm is consistent with the wavelength average value of −2.5 dB/cm obtained using the ASE source.

The MZI was used to inspect the composite subwavelength-structured waveguide, in order to compute a group index with high accuracy. FIG. 8 graphs the group index of TM and TE modes through the SWG waveguide, and compares theoretical with observed group indices. The agreement between experiment and theory is excellent, indicating a low and almost constant group index of $n_g$~1.5 over the measured wavelength range. The nearly constant group index indicates that these SWG waveguides will be useful for high bit-rate processing, as well as in non-linear applications, because most non-linear optical applications, such as all-optical switching, four wave mixing, etc., rely on short pulses to achieve sufficient optical peak power, and the constant group index permits phase matching transmission with low temporal pulse spreading. Also for comparison, the theoretical group indices of TM and TE modes of photonic wires of comparable dimensions are shown in FIG. 8. It will be noted that a wide range of group indices could be engineered between the photonic wire modes and the SWG modes.

Investigations revealed that the SWG waveguide exhibits a high tolerance to the feature size variations that may arise from limited accuracy of the lithography and etching. The SWG coupler loss is little affected by changing the taper tip width from the nominal 350 nm to 300 nm, with an excess loss of less than 0.1 dB for both polarizations. This is a remarkably improved fabrication robustness compared to other coupler designs using conventional waveguides, which also shows that the SWG waveguides are less susceptible to dimension errors arising in the fabrication process. Independent measurement using a broadband Er-fibre source on a series of couplers (up to 62) connected back-to-back as −0.23 dB for TE and −0.47 dB for TM polarizations. The low intrinsic coupler loss is important as it allows a seamless integration of silicon strip and SWG waveguides in a photonic circuit. From the measured insertion loss, the waveguide propagation loss, and the coupler intrinsic loss, the total fibre-to-waveguide coupling efficiency was determined as −0.9 dB for TE and −1.2 dB for TM polarizations. This is the highest efficiency yet reported for a microphotonic coupler.

Waveguide Bends, Criss-Cross and Refractive Index Engineered Planar Waveguides

The composite subwavelength-structured waveguides can be exploited for a broad range of applications—for example optical interconnects and wavelength division multiplexing—as they provide a superior performance compared to conventional waveguides. In optical interconnects, for example, the ability to intersect waveguides with minimal loss and negligible crosstalk is crucial to facilitate circuit connectivity at a massive scale comparable to state-of-the-art electrical interconnects.

Each time a conventional waveguide intersects another waveguide in a planar photonic circuit, a substantial fraction of light is lost by diffraction at the crossing. Some of the signals get coupled as a crosstalk signal to the transverse waveguide. Here we present a solution to this problem by adiabatically transforming a strip waveguide to a subwavelength grating structure which acts as a non-resonant mode expander in the vicinity of the crossing region, while diffraction is still suppressed as a consequence of the subwavelength scale of the grating. The effective index of the crossing waveguides is decreased towards the intersection point by reducing the SWG duty ratio and the width of the silicon segments, as shown in FIG. 9a. Mode delocalization from the waveguide core, along with a reduced effective index of the crossing waveguide, decreases the scattering efficiency at the crossing.

This was confirmed in our measurements, which showed excellent optical isolation between the two waveguides with a crosstalk below −40 dB, which is more than a 25 dB improvement compared to a direct crossing of strip waveguides (260 nm×450 nm). In order to quantify the crossover loss, test structures with multiple (up to 80) waveguide crossings concatenated in series were fabricated, as shown in FIG. 9a. The insertion loss of these structures is analysed, and the loss per crossing is estimated to be −0.02 dB from the linear fit for TE polarization, and the polarization dependent loss is less than 0.01 dB. Compared to a direct crossing, the loss is decreased at least by a factor of 30. This is the lowest loss and minimal polarization dependence yet reported for crossings in high index contrast waveguides. An important practical advantage of our waveguide crossing compared to other designs is that, as a binary structure (the silicon layer has either the full starting thickness, or is completely etched away) it can be fabricated using a single etch step.

FIG. 9b shows a 5 µm radius bend. This waveguide exhibited a 0.1 dB loss per 90° bend. Ease of fabrication and low loss of these bends adds to the advantages to using composite subwavelength-structured waveguides.

Subwavelength grating waveguides circumvent an important limitation in integrated optics: i.e. the fixed value of the refractive indices of the constituent materials in the absence of active tuning mechanisms. For example, in silicon-based waveguides, media with a wide range of intermediate effective indices (1.6-3.5) can be engineered by modifying the volume fractions of silicon and SU-8 with a spatial accuracy of a few tens of nanometers, simply by lithographic patterning. This accurate control of refractive index in a specific location of a chip is highly desirable for building sophisticated microphotonic circuits.

Waveguide refractive index can be engineered not only in channel waveguides (FIGS. 2A-2G) but also in a slab waveguide. An example of such structure is shown in FIG. 2H. In FIG. 10a, an example of a fabricated SWG engineered slab waveguide is shown as implemented in a curved waveguide grating multiplexer circuit [P. Cheben, P. J. Bock, J. H. Schmid, J. Lapointe, S. Janz, D.-X. Xu, A. Densmore, A. Delâge, B. Lamontagne and T. J. Hall, "Refractive index engineering with subwavelength gratings implemented in a highly efficient microphotonic coupler and a planar waveguide multiplexer," Opt. Lett. 35, 2526-2528 (2010)]. The subwavelength structure provides sufficient optical confinement to make a waveguide, yet has a waveguide boundary that is transparent to the light propagating normal to this boundary. The purpose of using the subwavelength trench is two-fold: Near the strip waveguide an effective material index of n~2 is created. Here, the trench acts as a waveguide for light diffracted preferentially towards the slab waveguide region, while simultaneously as a lateral cladding for the strip waveguide. On the other side of the trench, near the slab waveguide combiner, a triangular SWG nanostructure is used as a graded-index medium to suppress Fresnel reflection for the light propagating from the trench to the slab waveguide. Transmission spectra for eleven channels of the multiplexer circuit is shown FIG. 10b.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. An optical system comprising:
a component having at least one waveguide extending between waveguide ends, formed in part of at least one layer of the component that extends over a substrate of the component, the waveguide comprising a composite subwavelength structured core, and a cladding adjacent to the core, on at least one side; and wavelength-limiting optical elements in optical communication with the waveguide ends, that pass light of wavelengths higher than a cutoff wavelength $\lambda_c$, and does not effectively propagate wavelengths below $\lambda_c$, whereby useful optical signals passing through the waveguide are in one or more linewidths or bandwidths having wavelength(s) greater than $\lambda_c$, wherein:
  a. the composite structured core is formed of materials of at least two distinct indices of refraction,
  b. a sequence of interfaces defined between the at least two materials meet at interfaces along a direction of propagation of the waveguide,
  c. three sequential interfaces are separated by less than about $\frac{1}{2}\lambda_c/n_{eff}$, whereby diffraction of the useful optical signals is suppressed, and
  d. an effective index of refraction of the material is constant across the waveguide, to the extent that the composite structured core is effectively a homogeneous medium.

2. The optical system of claim 1 wherein the composite structured core comprises interlaced segments of the at least two materials, each segment extending the full dimensions of the waveguide core in two transverse directions, producing interfaces that are the full dimensions of the waveguide core.

3. The optical system of claim 2 wherein the composite structured core consists of the interlaced segments.

4. The optical system of claim 2 wherein only interfaces between the at least two materials form the sequence of interfaces.

5. The optical system of claim 2 wherein each interface is oriented substantially perpendicular to a direction of propagation of the waveguide.

6. The optical system of claim 2 wherein the waveguide core has constant dimensions in the direction of propagation.

7. The optical system of claim 2 wherein the waveguide core comprises a solid inner core that extends the length of the waveguide, and an outer core partially surrounding the solid inner core, the solid inner core having a constant cross-section, wherein the interfaces are provided in the outer core, which is formed of interlaced segments of the at least two materials.

8. The optical system of claim 1 wherein the component comprises a substrate structure comprising a stack of layers including a substrate, a bottom cladding, the composite structured core, and top cladding, the substrate structure qualified by one or more of the following:
  a. at least one of the bottom cladding and the top cladding is formed of one of the at least two materials;
  b. the substrate is formed of a semi-insulating wafer; and
  c. the core is formed by lithographic deposition.

9. The optical system of claim 1 wherein the component comprises one or more of the following:
  a. a plurality of waveguides between respective ingresses, egresses, junctions, and optical devices;
  b. at least one other waveguide crossing the waveguide at a junction;
  c. at least one other waveguide crossing the waveguide at a junction comprising waveguide segments having cores with reduced mode confinement, whereby loss and crosstalk at the intersection is reduced.

10. The optical system of claim 1 wherein the core defines a periodic or aperiodic pattern of the first and second materials in a one or two dimensional array.

11. The optical system of claim 2 wherein the core consists of a fixed volume ratio of the segments, wherein the segments have known optical properties, and the fixed volume ration is chosen to imbue the waveguide with one or more of: a desired index of refraction; a desired electric field strength within the respective segments; a desired dispersion; a desired thermal sensitivity; a desired polarization mode dispersion; and a polarization dependent loss.

12. The optical system of claim 11 wherein the fixed volume ratio of the segments imbues the waveguide with a polarization dependent loss of less than 0.5 dB/mm.

13. The optical system of claim 1 wherein one of the at least two materials is a nonlinear optical material.

14. The optical system of claim 13 wherein the nonlinear optical material is responsive to:
  an electric field, to change a phase of light passing therethrough;
  an electromagnetic field, to change a complex amplitude of light passing therethrough, and the waveguide comprises electrodes to permit the waveguide to act as a part of an optical modulator;
  an electromagnetic field, to permit the waveguide to serve as an optical gain; and
  an electromagnetic field, to permit the waveguide to serve as a laser.

15. The optical system of claim 1 wherein the component further comprises a mode adapter at one of the ends, the mode adapter comprising a composite structured segment like the waveguide in that it is formed of the at least two materials, includes a sequence of interfaces between the materials oriented substantially perpendicular to a direction of propagation, with three sequential interfaces being separated by less than about $\frac{1}{2}\lambda_c/n_{eff}$ but differs from the waveguide in that an effective index of refraction of the material changes continuously constant across the mode adapter.

16. The optical system of claim 1 wherein the wavelength-limiting element is one of the following: a photodetector, a laser, a mode adapter, a lens, a detector, a sensor, a coupler, a filter, a coating, a dichroic mirror, VCSEL, a light emitting diode, a coherent, partially coherent, or incoherent light source, an interconnecting waveguide, a modulator, an optical amplifier, an optical fibre, a diffraction grating, or a sub-wavelength grating.

17. The optical system of claim 1 wherein the component comprises a microphotonic circuit.

* * * * *